Dec. 3, 1946.  E. GOTTSCHALK  2,412,042
METHOD OF MAKING RUBBER FOOTWEAR
Filed Dec. 30, 1944
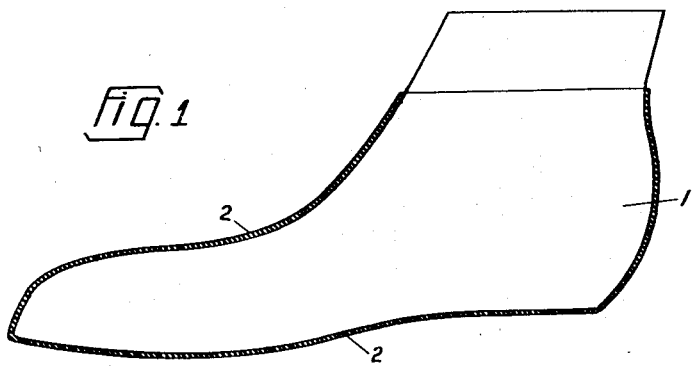
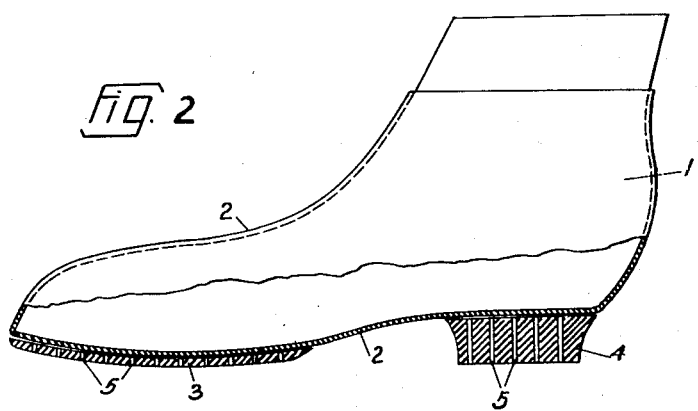
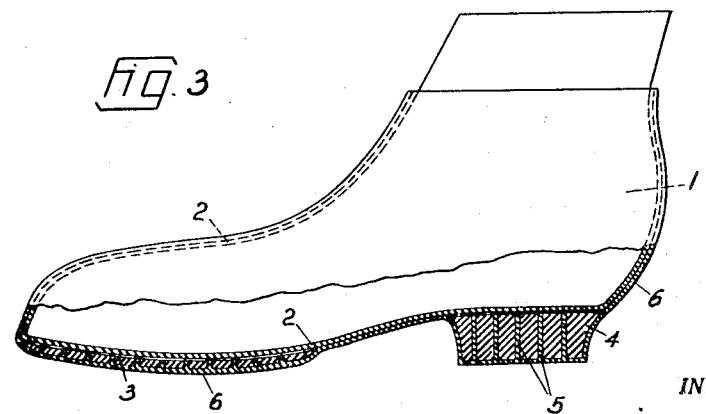
INVENTOR.
EMIL GOTTSCHALK
BY
ATTORNEY Patented Dec. 3, 1946

2,412,042

UNITED STATES PATENT OFFICE 2,412,042

METHOD OF MAKING RUBBER FOOTWEAR

Emil Gottschalk, New York, N. Y.

Application December 30, 1944, Serial No. 570,576

1 Claim. (Cl. 12—142)

The invention relates to methods for the manufacturing of hollow rubber articles from liquid rubber or latex compounds, for instance from rubber or latex solutions and dispersions and to articles manufactured by this method.

Hollow rubber articles of the above mentioned type are frequently made by the so-called dipping method.

A mold resembling the shape of the final article made of wood, metals, plastics or other suitable materials is lowered into the solution or emulsion of a natural or synthetic rubber or latex compound and maintained in the bath for a certain time; the mold is then lifted from the bath and the latex or rubber layer deposited on the mold is dried; this procedure is repeated until the desired wall thickness of the final article has been reached. The thus produced hollow rubber body is vulcanized on the mold and stripped therefrom, representing the finished article. Several additional measures are generally exercised in conjunction with this manufacture; but they need not be mentioned for the purposes of a proper description of this invention.

It is, however, apparent from the above that the final hollow articles, for instance rubber shoes or containers made in this manner will have a uniform wall thickness; the walls and the bottom of the containers and the uppers, soles, heels of the rubber shoes will, therefore, be equally thick.

It is the object of the invention to manufacture hollow rubber articles preferably by the described dipping method, individual parts of which have a different wall thickness.

It is a further object of the invention to provide dipped hollow rubber goods with structure reinforcing and strengthening elements and parts, or to reinforce the dipped article more or less entirely.

It is also an object of the invention to apply elements to the dipped articles which will enhance their usability and applicability.

It is a particular object of the invention to produce by the dipping method rubber containers having a reinforced bottom and rubber shoes having high heels and thick soles.

In order to accomplish the above recited and additional objects which will become apparent as this description proceeds, the following procedure is substantially adopted in conformity with the instant invention.

1. An unvulcanized hollow rubber body having a uniform wall thickness is produced in a customary manner from a liquid latex or rubber compound by the mold dipping method.

2. In order to reinforce this article wholly or partly or to provide the same with reinforcing elements or with parts to increase its usefulness, for instance, to apply to a container a more resistant bottom or strengthening walls, or to reinforce the same throughout, or to apply to a shoe a high heel and a thick sole, these additional elements or parts are shaped, for instance cut, from a sufficiently pliable and flexible material, such as rubber, felt, flexible plastics, soft leather, fabrics, and the like, and affixed to the dipped article still carried on the mold at their proper places; the used materials must be easily penetrable by the liquid rubber compound; otherwise the reinforcing parts shaped therefrom must be provided with bores or perforations previously to their application to the dipped article. Ordinary adhesives, adhesive cements, for instance rubber cements, may be used to accomplish the attachment of the additional reinforcing elements to the article; but other suitable means may be employed to produce a satisfactory union; care must be taken that the interstices or bores mentioned before are not filled out and left free by the uniting material. The rubber bodies which are still supported on the mold but are now provided with the additional or reinforcing elements are dipped again until a sufficiently strong outer coating is produced; the liquid latex or rubber compound enters into and penetrates through the affixed parts; in this manner a rubber or latex skeleton is formed which produces a highly resistant and reliable union of the dipped article, the added reinforcing parts or elements and the final outer coating.

4. The article is now vulcanized on the mold and stripped thereof, the thereto applied reinforcing elements or parts having sufficient pliability not to interfere with this procedure. The article is now ready for commercial use.

The creation of the uniting skeleton through and within the reinforcing elements or parts is an important feature of the invention because a very strong and reliable union is accomplished in this manner between the dipped article and the outer final coating; it may have been stated that the application of reinforcing textiles to dipped rubber articles during their production is known as such.

Instead of making the reinforcing additional parts, for instance the sole and the heel of a shoe, as a single part, the same may be built up from individual layers of the perforated materials and applied to the article in conformity with successive dippings.

The manufacture of a rubber shoe to be provided with a high heel and a thick sole has been chosen to illustrate with reference to the attached drawing a detailed manner of carrying the instant invention into effect.

In the drawing,

Fig. 1 is a vertical part sectional elevation of a rubber shoe produced on a mold by the dipping method, the mold being shown as a side view;

Figs. 2 and 3 are similar elevations showing the attachment of sole and heel and of the outer rubber coating.

Referring to the drawing 1 is an ordinary shoe mold or last usable for the dipping method.

This mold is placed in a bath consisting of a latex or rubber compound, not shown, whereby the shoe body 2 is deposited thereon in the usual manner by one or repeated dippings. The mold 1 carrying the shoe 2 deposited thereon is shown in Fig. 1 which, therefore, illustrates the first step of the previously described manufacturing method.

As soon as the shoe body 2 has been formed on the mold a sole 3 and a heel 4, cut from a suitable flexible material such as rubber, sponge rubber, felt, cardboard, are affixed to the shoe body 2 at the proper places and fastened thereto by gluing or in any other suitable manner, as shown in Fig. 2, illustrating the second step of the instant manufacturing method. As apparent from the drawing, sole 3 and heel 4 are provided with channels or bores 5.

The shoe carrying mold is now again dipped into a rubber or latex bath and the final outer coating 6 is deposited thereon. At the same time the rubber liquid penetrates through bores 5 until it reaches the shoe body 2. A skeleton 6 is formed thereby which produces a very strong reliable union between shoe body 2 outer coating 6, heel 4 and sole 3.

The creation of this intense union is an important element of the invention.

The shoe is now vulcanized on the mold 1 in the customary manner and stripped thereof, forming the finished article.

In the same manner as described above any other dipped hollow article, such as a rubber container, may be provided with a reinforcing bottom, with strengthened walls or both, the reinforcing parts being formed from a perforated sheet of a suitable material, as in this case the stripping of the final article from the mold is much less complicated than in the case of a shoe, less flexible materials, such as cork, may be successfully used.

I claim:

Method of making a rubber shoe comprising forming the upper on a mold by depositing on said mold a layer of rubber from a latex or rubber solution, affixing to the thus formed upper while being carried on said mold a sole and a heel of a material provided with bores, depositing upon said upper an outer rubber coating from rubber or latex solution, penetrating said bores with said rubber solution, producing at the same time within the bores of said sole and heel a rubber skeleton by penetration of the bores with said rubber or latex solution, uniting thereby said upper, said outer coating and said sole and heel through said bores, and vulcanizing the shoe.

EMIL GOTTSCHALK.